US010919111B2

(12) United States Patent
Rubens et al.

(10) Patent No.: US 10,919,111 B2
(45) Date of Patent: Feb. 16, 2021

(54) LASER ENGRAVER MIRROR ADJUSTMENT SYSTEM

(71) Applicants: Robert Bosch Tool Corporation, Broadview, IL (US); Robert Bosch GmbH, Stuttgart (DE)

(72) Inventors: Jeremy Rubens, Palatine, IL (US); Christopher R. Crowell, Chicago, IL (US); Robert W. Ward, Philadelphia, PA (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 91 days.

(21) Appl. No.: 16/210,995

(22) Filed: Dec. 5, 2018

(65) Prior Publication Data

US 2020/0180067 A1    Jun. 11, 2020

(51) Int. Cl.
*B23K 26/042*   (2014.01)
*B23K 26/06*    (2014.01)
(Continued)

(52) U.S. Cl.
CPC .......... *B23K 26/042* (2015.10); *B23K 26/032* (2013.01); *B23K 26/046* (2013.01);
(Continued)

(58) Field of Classification Search
CPC .... B23K 26/04; B23K 26/042; B23K 26/032; B23K 26/046; B23K 26/0643; B23K 26/362; G01S 7/497; G01B 11/002
(Continued)

(56) References Cited

U.S. PATENT DOCUMENTS 4,803,371 A   2/1989  Durland
4,918,284 A   4/1990  Weisz
(Continued)

FOREIGN PATENT DOCUMENTS

EP    0 234 721 A1    9/1987

OTHER PUBLICATIONS

"LMF-AF Adjustable Focus Marker", Technical Data Sheet, Amada Miyachi America, Inc. 2017 (2 pages).
(Continued)

*Primary Examiner* — Rocio Del Mar Perez-Velez
*Assistant Examiner* — Alicia M. Choi
(74) *Attorney, Agent, or Firm* — Maginot, Moore & Beck LLP

(57) ABSTRACT

In one embodiment, a laser engraving system includes a laser transmitter and a lens assembly configured to focus a transmitted laser beam onto a workpiece supported by a workpiece support surface. A rail system movably supports a base which in turn supports a mirror and a camera. A controller is operably connected to the camera and is configured to execute program instructions stored in a memory to obtain first image data from the camera indicative of a first location of the laser beam on the mirror when the camera and the mirror are at a first rail system location, obtain second image data from the camera indicative of a second location of the laser beam on the mirror when the camera and the mirror are at a second rail system location, and output a mirror adjustment signal for the mirror based upon the first signal and the second signal.

20 Claims, 5 Drawing Sheets

(51) Int. Cl.
*B23K 26/362* (2014.01)
*B23K 26/03* (2006.01)
*B23K 26/046* (2014.01)
*G05B 19/18* (2006.01)

(52) U.S. Cl.
CPC ........ *B23K 26/0643* (2013.01); *B23K 26/362* (2013.01); *G05B 19/18* (2013.01)

(58) Field of Classification Search
USPC ........................................................ 700/166
See application file for complete search history.

(56) References Cited

U.S. PATENT DOCUMENTS

| | | | |
|---|---|---|---|
| 4,998,260 A | | 3/1991 | Taniura |
| 5,011,282 A | * | 4/1991 | Ream .................. B23K 26/043 356/153 |
| 5,430,666 A | | 7/1995 | DeAngelis et al. |
| 5,832,415 A | | 11/1998 | Wilkening et al. |
| 6,483,596 B1 | | 11/2002 | Philippi et al. |
| 6,615,099 B1 | | 9/2003 | Müller et al. |
| 6,678,061 B2 | | 1/2004 | Kilthau et al. |
| 7,750,266 B2 | | 7/2010 | Dane et al. |
| 9,993,976 B2 | | 6/2018 | Coeck et al. |
| 2010/0264302 A1 | | 10/2010 | Philippi |
| 2010/0292947 A1 | | 11/2010 | Buk |
| 2011/0100967 A1 | | 5/2011 | Yoo et al. |
| 2011/0249256 A1 | | 10/2011 | Scaggs |
| 2017/0015046 A1 | | 1/2017 | Lim |
| 2018/0311762 A1 | * | 11/2018 | Van Der Stam ..... B23K 26/032 |

OTHER PUBLICATIONS

Vasquez, J., "Aligning Invisible Lasers on-the-cheap," Hackaday, https://hackaday.com/2016/03/10/aligning-invisible-lasers-on-the-cheap/, 2016 (16 pages).
"Diagnosing Laser Cutter Alignment Problems," Leeds Hackspace, https://leedshackspace.org.uk/2013/05/26/diagnosing-laser-cutter-alignment-problems/laseralignprogress/, 2013 (6 pages).
Search Report corresponding to GB application No. GB1915801.3 Search Report, dated May 1, 2020 (2 pages).

* cited by examiner

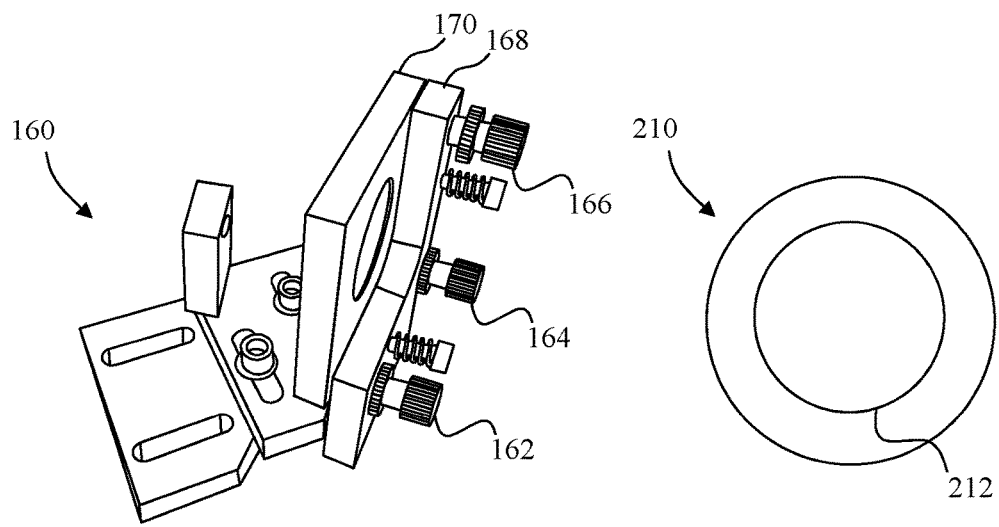
FIG. 4
FIG. 7
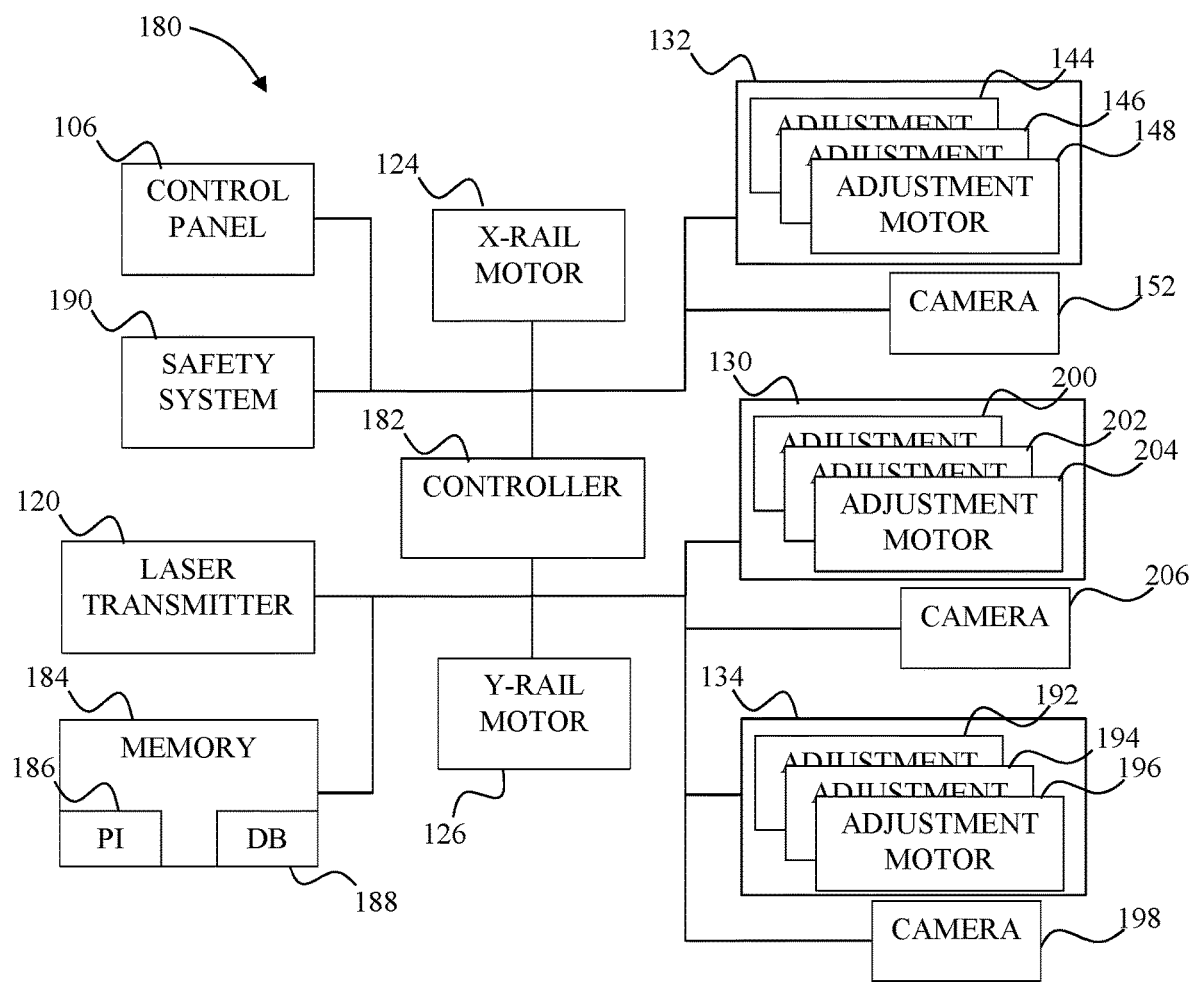
FIG. 5

LASER ENGRAVER MIRROR ADJUSTMENT SYSTEM

FIELD

The disclosure relates to laser engravers and particularly to laser engravers incorporating mirrors to route a laser beam.

BACKGROUND

Laser engravers used in industry are well known. Lately, consumer sized laser engravers have become commercially available. Complex systems which require highly qualified operators to maintain the systems may be suitable for industrial systems. Consumers, however, do not typically have the advanced training of commercial operators. Accordingly, the shift into consumer sized laser engraving systems has created a desire for systems which are easier to maintain and operate than the systems used in industry.

In known consumer laser engraving systems, laser transmitters and a series of mirrors are used to route a laser beam from the transmitter to the workpiece. The mirrors are mounted on a rail system which is used to position the mirrors at the necessary locations in order to direct the laser beam onto a workpiece. The mirror and rail system is then used to maneuver the laser beam over the workpiece to burn an image on, or cut through, the workpiece. Positioning of the laser beam is typically accomplished using a processor which controls the mirror and rail system based upon a pattern which is stored in a memory. The alignment of the mirror system is thus critical to realizing good quality burning and cutting performance. The mirrors, however, commonly become misaligned during shipping and during use of the device. Accordingly, the consumer is required to adjust the mirrors on a relatively frequent basis.

Unfortunately, the mirror adjustment process is a time consuming and complex effort. Typically, the user visually assesses the location of the laser beam at various mirrors, or merely pulses the laser to form a mark on the workpiece or pieces of material attached to the mirrors. The user then attempts to adjust one or more of the mirrors based upon the visual observation. The process is more of a "trial and error" approach which frequently leaves the consumer frustrated.

It is therefore desirable to have a mirror adjustment process which is easy for a consumer to follow. It would be further beneficial to provide a system which automatically performs the mirror adjustment without requiring the user to evaluate laser beam location or reposition mirrors.

SUMMARY

In one embodiment, a laser engraving system includes a laser transmitter, a workpiece support surface, and a lens assembly configured to focus the transmitted laser beam onto a workpiece supported by the workpiece support surface. The system further includes a first base supporting a first mirror and a first camera, and a rail system supporting the first base and configured to move the first base. A controller is operably connected to the first camera and a memory, and is configured to execute program instructions stored in the memory to obtain a first image data from the first camera indicative of a first location of the transmitted laser beam on the first mirror when the first camera and the first mirror are at a first rail system location, and obtain a second image data from the first camera indicative of a second location of the transmitted laser beam on the first mirror when the first camera and the first mirror are at a second rail system location. The controller then outputs a first mirror adjustment signal for the first mirror based upon the first image data and the second image data.

In one or more embodiments, the controller is further operably connected to the rail system and configured to execute the program instructions stored in the memory to control the rail system to position the first camera and the first mirror at the first rail system location by positioning the first base at the first rail system location, and to position the first camera and the first mirror at the second rail system location by positioning the first base at the second rail system location.

In one or more embodiments, the controller is further operably connected to the laser transmitter and configured to execute the program instructions stored in the memory to control the laser transmitter to transmit the laser beam when the first camera and the first mirror are positioned at the first rail system location, and to transmit the laser beam when the first camera and the first mirror are positioned at the second rail system location.

In one or more embodiments, the laser engraving system includes at least one first motor operably connected to the first mirror, the at least one first motor configured to adjust an angular orientation of the first mirror with respect to the laser beam. In these embodiments, the controller is further operably connected to the at least one first motor and configured to execute the program instructions stored in the memory to control the at least one first motor to adjust the angular orientation of the first mirror using the first mirror adjustment signal.

In one or more embodiments, the laser engraving system also includes a graphical user interface, wherein the controller is further configured to execute program instructions stored in the memory to control the graphical user interface to display user instructions based upon the output first mirror adjustment signal.

In one or more embodiments, a second mirror assembly like the first mirror assembly is included. In these embodiments, the controller is further configured to execute program instructions stored in the memory to obtain a third image data from the second camera indicative of a third location of the transmitted laser beam on the second mirror when the second camera and the second mirror are at a third rail system location, and to obtain a fourth image data from the second camera indicative of a fourth location of the transmitted laser beam on the second mirror when the second camera and the second mirror are at a fourth rail system location. The controller further outputs a second mirror adjustment signal for the second mirror based upon the third image data and the fourth image data.

In one or more embodiments, the controller is further configured to execute the program instructions stored in the memory to control the rail system to position the second camera and the second mirror at the third rail system location by positioning the second base at the third rail system location, and to position the second camera and the second mirror at the fourth rail system location by positioning the second base at the fourth rail system location.

In one or more embodiments, the controller is further configured to execute the program instructions stored in the memory to control the laser transmitter to transmit the laser beam when the second camera and the second mirror are positioned at the third rail system location, and to transmit the laser beam when the second camera and the second mirror are positioned at the fourth rail system location.

In one or more embodiments, the laser engraving system includes at least one second motor operably connected to the second mirror, and the at least one second motor is configured to adjust an angular orientation of the second mirror with respect to the laser beam. In these embodiments, the controller is further operably connected to the at least one second motor and configured to execute the program instructions stored in the memory to control the at least one second motor to adjust the angular orientation of the second mirror using the second mirror adjustment signal.

In one or more embodiments, the laser engraving system also includes a graphical user interface, and the controller is configured to execute program instructions stored in the memory to control the graphical user interface to display user instructions based upon the output second mirror adjustment signal.

In one embodiment, a method of operating a laser engraving system including a workpiece support surface and a lens assembly configured to focus a transmitted laser beam from a laser transmitter onto a workpiece supported by the workpiece support surface, includes positioning a first base supporting a first camera and a first mirror at a first rail system location using a rail system supporting the first base and configured to move the first base. Once positioned, a laser beam is transmitted with the laser transmitter onto the first mirror while the first mirror is at the first rail system location. The method includes obtaining with a controller a first image data from the first camera indicative of a first location of the transmitted laser beam on the first mirror when the first camera and the first mirror are at the first rail system location, positioning the first base at a second rail system location using the rail system thereby positioning the first camera and the first mirror at the second rail system location, and transmitting the laser beam with the laser transmitter onto the first mirror while the first mirror is at the second rail system location. The controller then obtains a second image data from the first camera indicative of a second location of the transmitted laser beam on the first mirror when the first camera and the first mirror are at the second rail system location, determines with the controller first mirror adjustment data based upon the first image data and the second image data by executing with the controller program instructions stored in a memory, and outputs a first mirror adjustment signal for the first mirror based upon the determined first mirror adjustment data. The first mirror is then adjusted based upon the first mirror adjustment signal.

In one or more embodiments of the method, positioning the first base at the first rail system location includes controlling the rail system with the controller to position the first base at the first rail system location, and positioning the first base at the second rail system location includes controlling the rail system with the controller to position the first base at the first rail system location.

In one or more embodiments of the method, transmitting the laser beam with the laser transmitter onto the first mirror while the first mirror is at the first rail system location includes controlling the laser transmitter with the controller to transmit the laser beam with the laser transmitter onto the first mirror while the first mirror is at the first rail system location. In these embodiments, transmitting the laser beam with the laser transmitter onto the first mirror while the first mirror is at the second rail system location includes controlling the laser transmitter with the controller to transmit the laser beam with the laser transmitter onto the first mirror while the first mirror is at the second rail system location.

In one or more embodiments of the method, adjusting the first mirror based upon the first mirror adjustment signal includes controlling with the controller at least one first motor operably connected to the first mirror to adjust an angular orientation of the first mirror with respect to the laser beam using the first mirror adjustment signal.

In one or more embodiments of the method, outputting the first mirror adjustment signal includes controlling a graphical user interface with the controller to display user instructions based upon the first mirror adjustment signal.

In one or more embodiments of the method wherein a second base, camera, and mirror are provided, the method includes transmitting the laser beam with the laser transmitter onto the second mirror while the second mirror is at a third rail system location, obtaining with the controller a third image data from the second camera indicative of a third location of the transmitted laser beam on the second mirror when the second camera and the second mirror are at the third rail system location, positioning the second base at a fourth rail system location using the rail system thereby positioning the second camera and the second mirror at the fourth rail system location, transmitting the laser beam with the laser transmitter onto the second mirror while the second mirror is at the fourth rail system location, and obtaining with the controller a fourth image data from the second camera indicative of a fourth location of the transmitted laser beam on the second mirror when the second camera and the second mirror are at the fourth rail system location. In these embodiments the method further includes determining with the controller second mirror adjustment data based upon the third image data and the fourth image data by executing with the controller program instructions stored in the memory, outputting a second mirror adjustment signal for the second mirror based upon the second mirror adjustment data, and adjusting the second mirror based upon the second mirror adjustment signal.

In one or more embodiments of the method, positioning the second base at the third rail system location comprises controlling the rail system with the controller to position the second base at the third rail system location, and positioning the second base at the fourth rail system location comprises controlling the rail system with the controller to position the second base at the fourth rail system location.

In one or more embodiments of the method, transmitting the laser beam with the laser transmitter onto the second mirror while the second mirror is at the third rail system location comprises controlling the laser transmitter with the controller to transmit the laser beam with the laser transmitter onto the second mirror while the second mirror is at the third rail system location, and transmitting the laser beam with the laser transmitter onto the second mirror while the second mirror is at the fourth rail system location comprises controlling the laser transmitter with the controller to transmit the laser beam with the laser transmitter onto the second mirror while the second mirror is at the fourth rail system location.

In one or more embodiments of the method, adjusting the second mirror based upon the second mirror adjustment signal includes controlling with the controller at least one second motor operably connected to the second mirror to adjust an angular orientation of the second mirror with respect to the laser beam using the second mirror adjustment signal.

In one or more embodiments of the method, outputting the second mirror adjustment signal includes controlling a graphical user interface with the controller to display user instructions based upon the second mirror adjustment signal.

BRIEF DESCRIPTION OF THE DRAWINGS

The foregoing aspects and other features are explained in the following description, taken in connection with the accompanying drawings.

FIG. 4 depicts a schematic view of a mirror assembly of the laser engraving system of FIG. 1 incorporating adjustment screws.

FIG. 5 depicts a schematic diagram of a control system of the laser engraving system of FIG. 1 which is used to control operation of the laser engraving system.

FIG. 7 depicts a schematic plan view of a mirror incorporating a reference mark which in some embodiments is incorporated into one or more mirror assemblies of the laser engraving system of FIG. 1.

DETAILED DESCRIPTION

Figure 1:
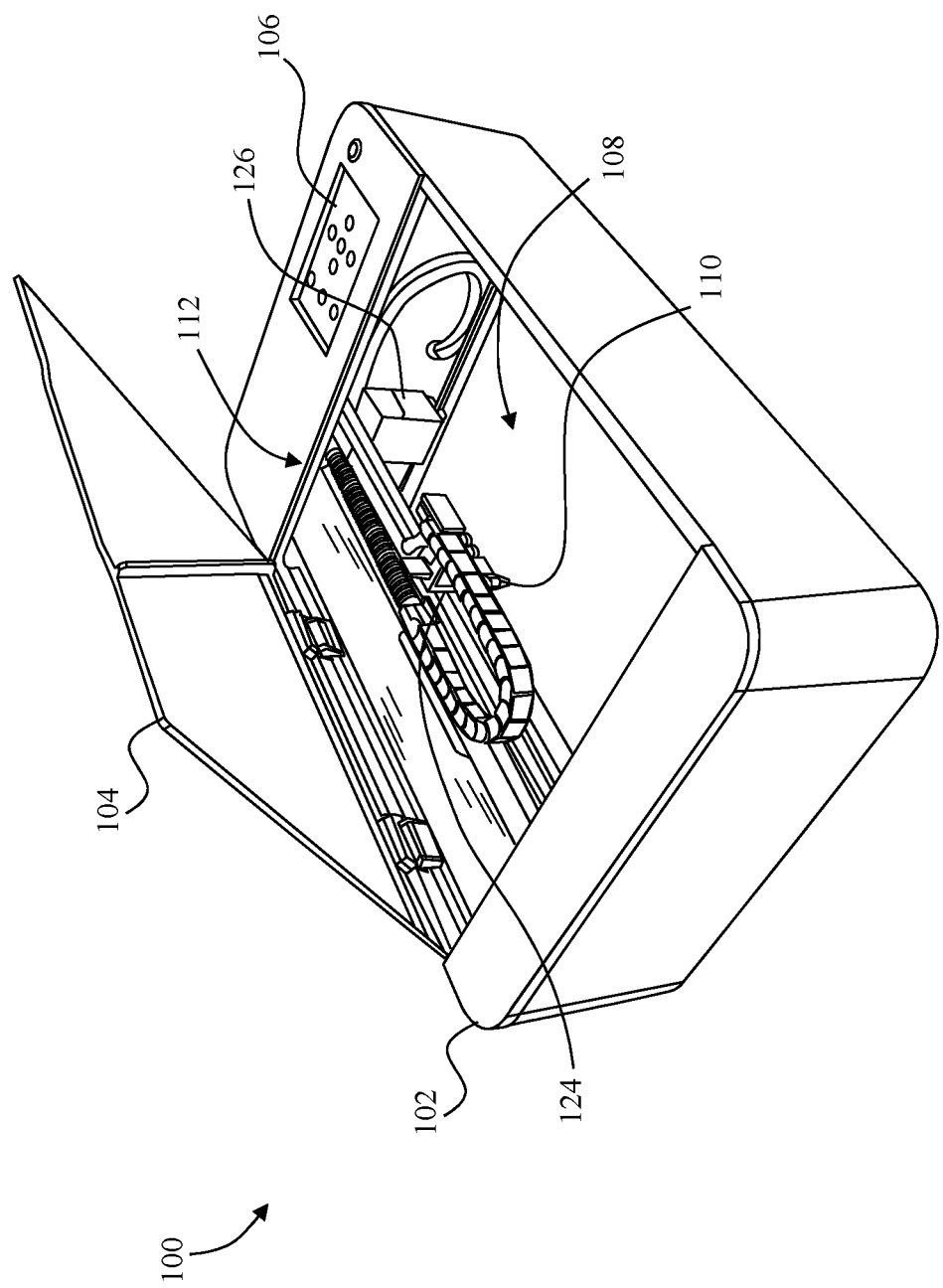
FIG. 1 depicts a perspective view of a laser engraving system.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

Figure 2:
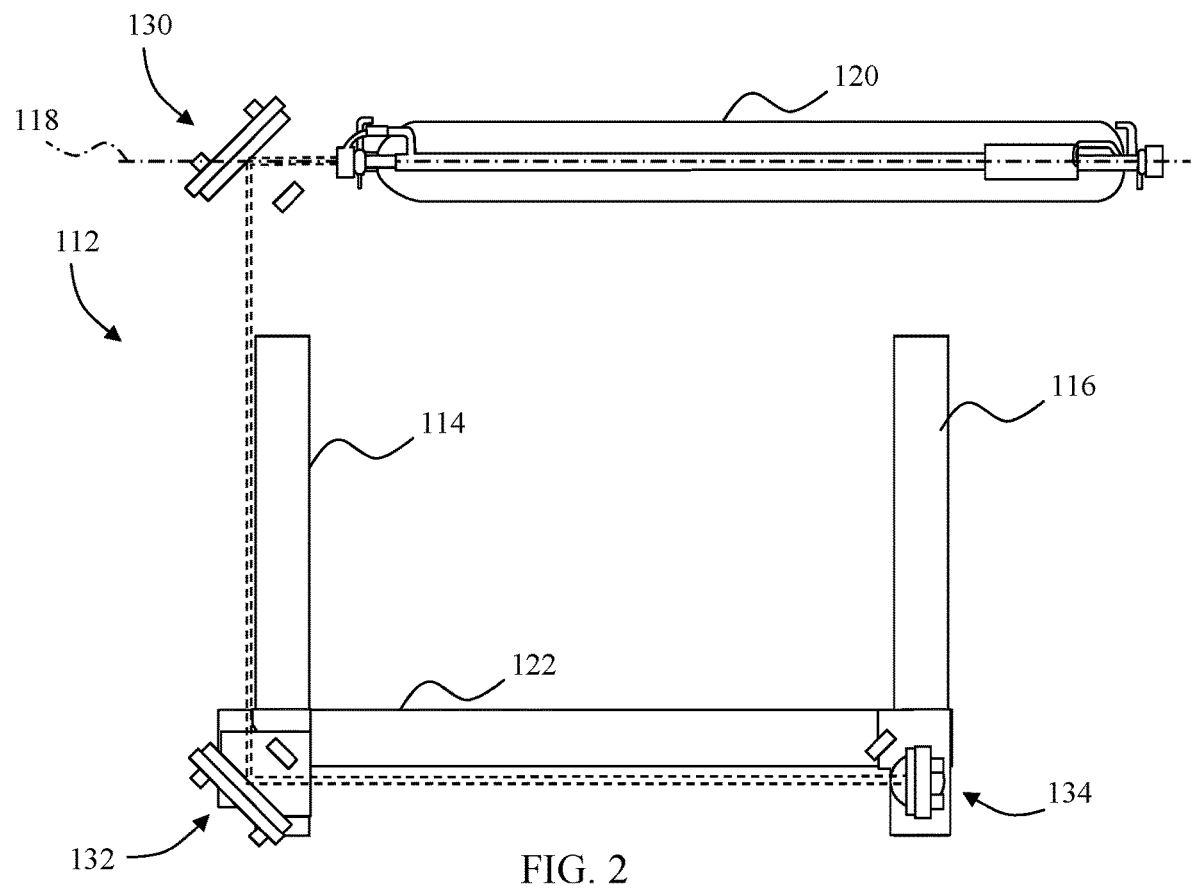
FIG. 2 depicts a simplified schematic view of the rail system of the laser engraving system of FIG. 1.

FIG. 1 depicts a laser engraving system 100. The laser engraving system 100 includes a case 102, a lid 104, and a control panel 106 in the form of a graphic user interface as is known in the art. A workpiece support surface 108 is located within the case generally below a lens assembly 110. The lens assembly 110 is carried by a rail system 112 which is discussed in more detail with reference to FIG. 2.

The rail system 112 includes two y-axis rails 114 and 116 which are fixedly attached to the case 102 so as to be orthogonal to an axis 118 which is defined by a laser transmitter 120. An x-axis rail 122 is supported by the two y-axis rails 114 and 116. The x-axis rail is parallel to the axis 118. Referring back to FIG. 1, the rail system 112 further includes an x-rail motor 124 and a y-rail motor 126. The x-rail motor 124 is configured to drive the lens assembly 110 along the x-axis rail 122 while the y-rail motor 126 is configured to drive the x-axis rail along the y-axis rails 114 and 116.

Figure 3:
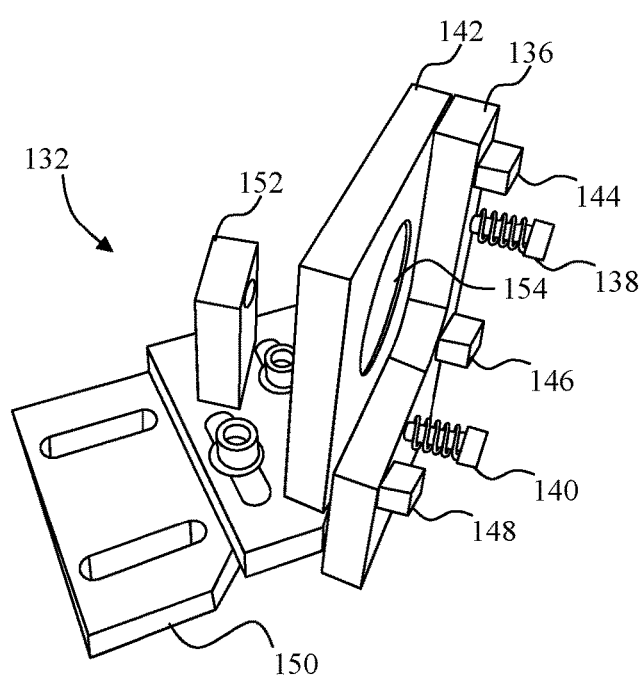
FIG. 3 depicts a schematic view of a mirror assembly of the laser engraving system of FIG. 1 incorporating adjustment motors.

Returning to FIG. 2, the laser engraving system 100 further includes three mirror assemblies 130, 132, and 134. The mirror assemblies 130, 132, and 134 are similar and are described with reference to the mirror assembly 132 depicted in FIG. 3. The mirror assembly 132 includes a support frame 136. Two fastening members 138 and 140 resiliently bias a mirror mount 142 toward the support frame 136. The support frame 136 supports the mirror mount 142 through the fastening members 138/140. Three adjustment motors 144, 146, and 148 are configured to impinge the mirror mount 142 through the support frame 136 so as to pivot the support frame 142 on the fastening members 138/140. For example, an adjustment shaft or pin in some embodiments threadedly engages the support frame such that rotation by the motors causes the shaft to move the mirror mount.

The support frame 136 is fixedly attached to a base 150 which is in turn fixedly attached to the x-axis rail 122. A camera 152 is also fixedly attached to the base 150. The camera 152, which in one embodiment is a commercially available high resolution smart camera accurate within 0.2 mm, is arranged to capture images of a mirror 154 fixedly supported by the mirror mount 142.

As noted above, the mirror assemblies 130, 132, and 134 are similar. In some embodiments, however, the mirror assembly 130 is mounted directly to the case 102 rather than to a base. In some embodiments, the base for the mirror assembly 132 is provided in the form of the x-axis rail 122. In some embodiments the base for the mirror assembly 134 is modified from the base 150 to accommodate movement of the mirror assembly 134 by the x-rail motor 124.

In some embodiments, adjustment motors 144, 146, and 148 are omitted. By way of example, FIG. 4 depicts a mirror assembly 160 which is used in the laser engraving system in place of one or more of the mirror assemblies 130, 132, and 134. The mirror assembly 160 is similar to the mirror assembly 134. Rather than adjustment motors, however, the mirror assembly 160 includes adjustment screws 162, 164, and 166. The adjustment screws 162, 164, and 166 are threadedly engaged with the support frame 168 and include shafts (not shown) which extend through the support frame 168 and contact the mirror mount 170. The adjustment screws 162, 164, and 166 are thus configured to adjust the position of the mirror mount 170 in a manner similar to the adjustment motors 144, 146, and 148.

Control of the various components in the laser engraving system 100 is accomplished by a control system 180 schematically depicted in FIG. 5. The control system 180 includes the control panel 106, a controller 182, and a memory 184. The control panel 106 is embodied in various embodiments as one or more I/O devices which include a user interface, graphical user interface, keyboards, pointing devices, remote and/or local communication interfaces, displays, and other devices that allow externally generated information to be provided to the control system 180, and that allow internal information of the control system 180 to be communicated externally.

The controller 182 in one embodiment is a general purpose computer processing circuit such as a microprocessor and its associated circuitry. The controller 182 is operable to carry out the operations attributed to it herein.

Within the memory 184 are various program instructions 186. The program instructions 186, some of which are described more fully below, are executable by the controller 182 and/or any other components as appropriate. Adjustment databases 188 are also located within the memory 184.

The controller 182 is further operably connected to a safety system 190, the laser transmitter 120, the x-rail motor 124, the y-rail motor 126, the adjustment motors 144/146/148 and camera 152 associated with the mirror assembly 132, adjustment motors 192/194/196 and camera 198 associated with the mirror assembly 134, and adjustment motors 200/202/204 and camera 206 associated with the mirror assembly 130 (in some embodiments the adjustment motors 200/202/204 and camera 206 are omitted).

In different embodiments, one or more of the components of the control system 180 are provided, in whole or in part, as a separate device which may be remotely located from the other components of the system 180. By way of example, in one embodiment the controller 182 and the memory 184 are separately provided such as by a standalone workstation or laptop computer. In these embodiments, a second non-remote processing circuit/controller and a second non-remote memory are provided, e.g., within the case 102, to support the functions of the remote components such as by routing control signals to the various components in the control system 180.

Figure 6:
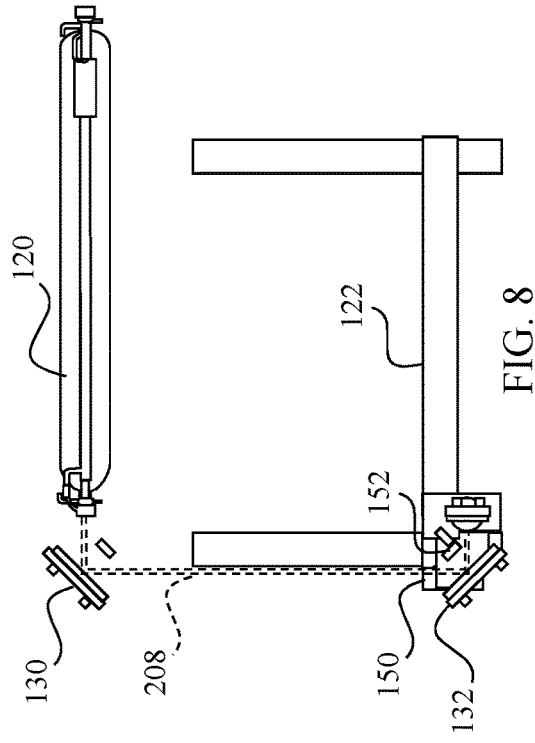
FIG. 6 depicts a simplified schematic view of the rail system of the laser engraving system of FIG. 1 with the lens assembly positioned to perform work on a workpiece.

During normal operations, the laser engraving system 100 operates in a manner similar to other laser engraving systems. In brief, the controller 182 executes program instructions 186 stored in the memory 184 to control the x-rail motor 124 and the y-rail motor 126 to move the lens assembly 110 and the x-axis rail 122, respectively, to predetermined locations on the x-axis rail 122 and the y-axis rails 114/116, respectively. During transit of the lens assembly 110 to the predetermined locations and/or upon arrival of the lens assembly 110 at a predetermined location, the controller controls the laser transmitter 120 to generate a laser beam 208 as depicted in FIG. 6. When the laser beam 208 is generated, the mirror assemblies 130, 132, and 134 reflect the laser beam 208 into the lens assembly 110 which focuses the transmitted laser beam onto a workpiece supported by the workpiece support surface 108 (see FIG. 1).

When adjustment of one or more of the mirror assemblies 130, 132, and 134 is desired, however, the controller 182 uses input from the associated camera 152/198/206 to determine necessary adjustments for the mirror assembly. By way of example, if the mirror 130 is to be adjusted, the controller 182 controls the laser transmitter 120 to generate the light beam 208 and controls the camera 206 to obtain an image of the location of the laser beam 208 on the mirror of the mirror assembly 130 and image data from the camera 206 is passed to the controller 182.

In some embodiments, a reference mark, such as a series of concentric circles/portions of circles is provided on the mirror which is also detected. By way of example, FIG. 7 depicts a mirror 210 which is used in one or more of the mirror assemblies in some embodiments. The mirror 210 includes a reference mark 212 in the form of a circle. In other embodiments the reference mark is one or more marks such as points. The reference mark need only be visible to the associated camera.

Based upon the location at which the laser beam 208 impinges the mirror of the mirror assembly 130, and the reference mark when provided, the controller 182 determines the needed movement of the adjustment motors 200/202/204 (or adjustment screws). In different embodiments, the needed movement is determined by calculating the movement of the mirror which is effected by rotation of the adjustment shafts, and by using a look-up table associating distance between the actual laser impingement location and a target/desired impingement location. The data needed for the determination is stored in the adjustment databases 188.

Once the needed movement is determined, the determined movement is output either as a command signal to the adjustment motors or as a signal used to generate a user discernable output identifying which adjustment screws are to rotated along a with rotation direction and rotation amount. The mirror is then adjusted based upon the determined movement and adjustment signal to position the mirror in the desired orientation with respect to the laser beam.

The adjustment process for mirror assemblies mounted on a rail system is similar. The main difference, however, is that the rails may also be misaligned with respect to the laser beam axis 118. To account for this additional complexity, additional data is obtained. After adjusting the mirror assembly 130 as needed, since its adjustment affects the location of the laser beam 208 on the mirror assemblies 132 and 134, the mirror assembly 132 is adjusted since its adjustment affects the location of the laser beam 208 on the mirror assembly 134.

In adjusting the mirror assembly 132, the controller 182 is used to control the y-rail motor 126 to drive the x-axis rail 122 to one end of the y-axis rails 114/116 if necessary although an intermediate location can be used if desired. By way of example, in FIG. 8 the y-rail motor 126 has been controlled to position the x-axis rail 122 at a location distal to the mirror assembly 130. Because the base 150 which supports the camera 152 and the mirror assembly 132 is fixedly attached to the x-axis rail 122, the y-rail motor further positions the base 150 along with the camera 152 and the mirror assembly 132 as a unit. The location of the mirror assembly 134 is not relevant at this point. The controller 182 then controls the laser transmitter 120 to generate the laser beam 208 and image data is obtained from the camera 152 in like manner as with the mirror assembly 130.

Figure 9:
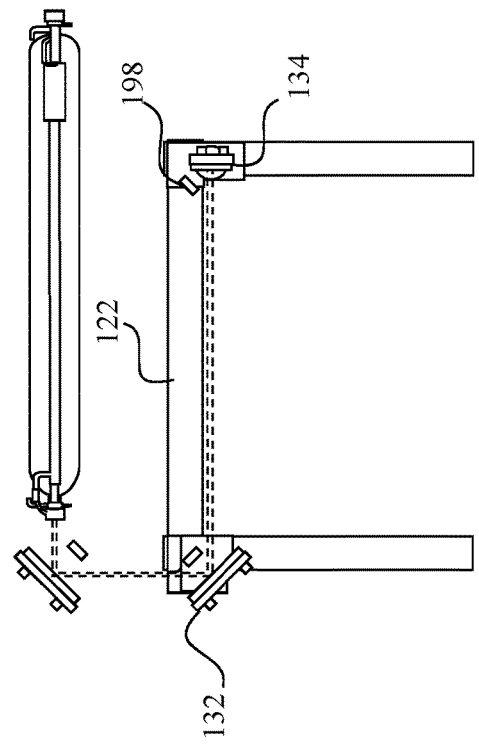
FIG. 9 depicts a simplified schematic view of the rail system of the laser engraving system of FIG. 1 with the x-axis rail positioned to obtain image data used to generate an adjustment signal for the mirror on the x-axis rail, and with the lens assembly positioned to obtain image data used to generate an adjustment signal for a mirror of the lens assembly.

The controller 182 then controls the y-rail motor 126 to position the x-axis rail 122 at a location proximal to the mirror assembly 130 as shown in FIG. 9. Because the base 150 which supports the camera 152 and the mirror assembly 132 is fixedly attached to the x-axis rail 122, the y-rail motor further positions the base 150 along with the camera 152 and the mirror assembly 132 as a unit. The location of the mirror assembly 134 is not relevant at this point. To minimize wear as well as time, however, the mirror assembly 134 is positioned in some embodiments at a location proximal or distal to the mirror assembly 132 at this time. The controller 182 then controls the laser transmitter 120 to generate the laser beam 208 and image data is again obtained from the camera 152.

Figure 8:
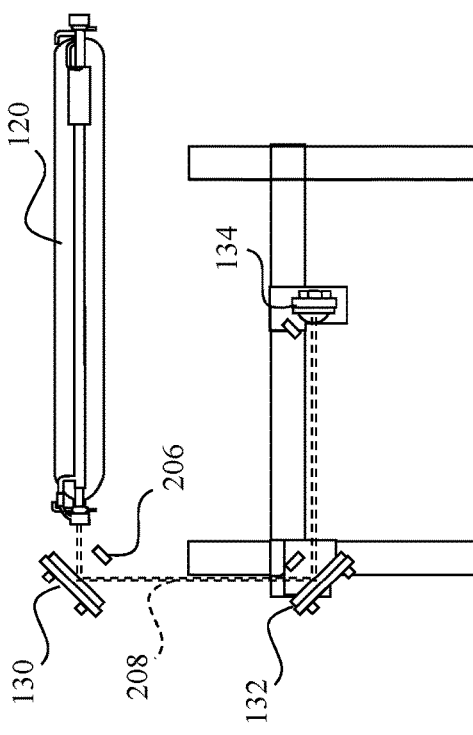
FIG. 8 depicts a simplified schematic view of the rail system of the laser engraving system of FIG. 1 with the x-axis rail positioned to obtain image data used to generate an adjustment signal for a mirror on the x-axis rail.

With image data from both the location depicted in FIG. 8 and the location depicted in FIG. 9, the controller 182 determines a desired modification of the adjustment of the mirror of mirror assembly 132. Because the rail system 112 may not be perfectly aligned to the axis 118 (see FIG. 2) however, there may not be a specific adjustment which provides precise orientation of the mirror in the mirror assembly 132 over the entire travel of the x-axis rail 122 along the y-axis rails 114/116. In such circumstances, the controller 182 in some embodiments determines a desired adjustment which minimizes the offset of the laser beam 208 from the optimal laser beam impingement location. The adjustment signal is then used in a manner similar to the adjustment signal described above for the mirror assembly 130.

In some embodiments the controller 182 provides a more precise adjustment over the entire travel of the x-axis rail 122. By way of example, in some embodiments the offset at the two imaged locations is used to generate controls for the associated adjustment motors as the x-axis rail 122 travels along the y-axis rails during normal operation. For locations between the two imaged locations, the controller in some embodiments interpolates between the imaged offsets to determine adjustment data in the form of interpolated adjustment data.

In some embodiments more than two locations are used to provide image data so as to further minimize errors. In other embodiments, a look up table is generated using the data from the imaging operation and stored in the adjustment database 188. The controller 182 then accesses the look up table in generating adjustment signals during normal operations. The above described active adjustment of the mirror assemblies provides increased accuracy throughout the travel of the x-axis rail.

Figure 10:
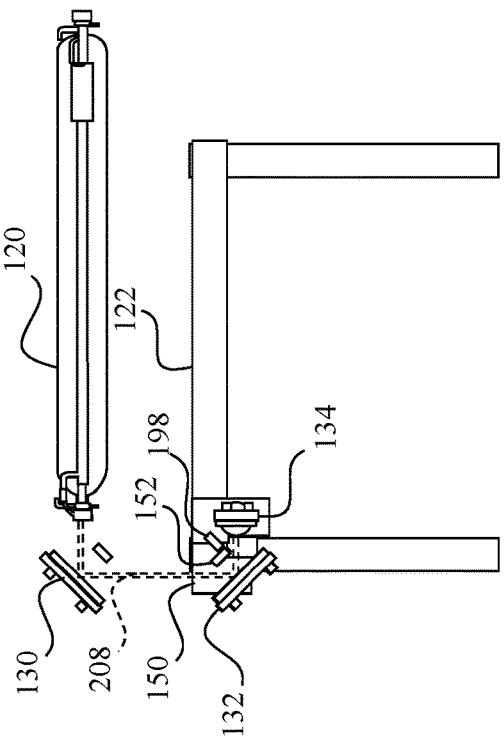
FIG. 10 depicts a simplified schematic view of the rail system of the laser engraving system of FIG. 1 with the lens assembly positioned to obtain image data used to generate an adjustment signal for a mirror of the lens assembly.

Once the adjustments for the mirror assembly 132 have been incorporated by use adjustment means such as adjustment screws or adjustment motors, the controller controls the rail system 112, the laser transmitter 120, and the camera 198 to obtain image data for the mirror assembly 134. The process for adjusting the mirror assembly 134 is substantially the same as the process for adjusting the mirror assembly 132. For example, in one embodiment, after the adjustment of the mirror assembly 132 is completed, with the mirror assembly 134 at the same location depicted in FIG. 9, the control circuit controls the laser transmitter 120 to generate a laser beam 208. After collecting image data from the camera 198, the controller 182 controls the y-rail motor 124 to move the mirror assembly 134 and camera 198 (and their associated base) as a unit from the location in FIG. 9 to a location distal to the mirror assembly 132 as depicted in FIG. 10 before obtaining further image data and generating adjustment signals.

The adjustment signals for the mirror assembly 134 in some embodiments are thus generated in substantially the same manner as described above for the mirror assembly 132. Additionally, in some embodiments wherein only a single adjustment is effected for the entire range of travel of the x-axis rail 122, increased accuracy is obtained by first positioning the x-axis rail 122 at a location at or about the midpoint of the y-axis rails 114/116 so as to minimize any errors in the orientation of the mirror assembly 132 when performing the data gathering for adjustment of the mirror assembly 134.

Figure 11:
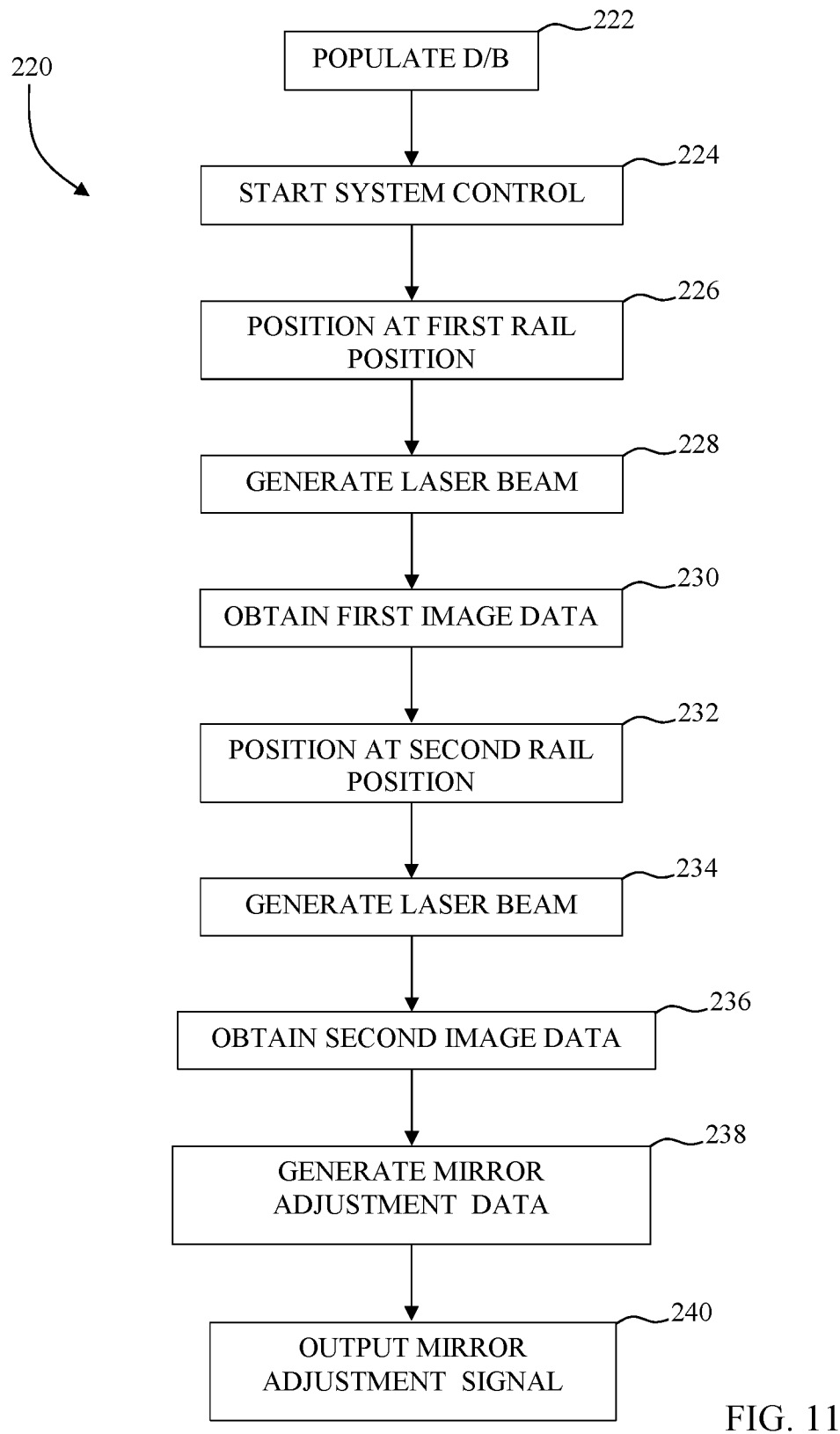
FIG. 11 depicts a process which is used to obtain image data and generate an adjustment signal for a mirror in the laser engraving system of FIG. 1.

FIG. 11 depicts an adjustment process 220 which is used in some embodiments to provide the above described adjustment of a mirror assembly. At block 222, the adjustment databases 188 are populated. Population of the adjustment database in different embodiments includes storing data regarding the effect of rotation of adjustment shafts on movement of an associated mirror such as thread pitch, structural details regarding the mirror and mount, etc., populating a look up table relating laser beam impingement error vectors to adjustment control signals, etc.

The controller 182 is controlled to begin adjustment data gathering at block 224 such as by pressing a start adjustment process button on a GUI such as the control panel 106 to perform some or all of the actions of the adjustment process 220 of FIG. 11 by accessing the memory 184 and executing the program instructions 186. For purpose of this example, the mirror assembly 130 has already been adjusted using, for example, a modified form of the adjustment process 220.

At block 226, the controller 182 controls the y-rail motor 126 to move the x-axis rail 122, and hence the mirror assembly 132 and camera 152, to a first rail system location (see, e.g., FIG. 8). The controller 182 then controls the laser transmitter 120 to generate the laser beam 208 (block 228). The camera 152 is then controlled by the controller 182 to obtain first image data indicative of the location of the laser beam 208 on the mirror of the mirror assembly 132 which is transmitted to the controller 182 (block 230).

At block 232, the controller 182 controls the y-rail motor 126 to move the x-axis rail 122, and hence the mirror assembly 132 and camera 152, to a second rail system location (see, e.g., FIG. 9). The controller 182 then controls the laser transmitter 120 to generate the laser beam 208 (block 234). The camera 152 is then controlled by the controller 182 to obtain second image data indicative of the location of the laser beam 208 on the mirror of the mirror assembly 132 which is transmitted to the controller 182 (block 236).

The controller 182 uses the obtained first and second image data to generate adjustment data at block 238, and outputs a mirror adjustment signal at block 240 based upon the generated adjustment data. The form of the output mirror adjustment signal varies depending upon the particular system. In non-automated systems, the mirror adjustment signal results in a user cognizable output such as a rendering of instructions on how to adjust the mirror assembly. In some embodiments the instructions are rendered on a graphical user interface. In other embodiments the adjustment signal is a control signal such as for one or more adjustment motors. The process 220 is then performed for the mirror assembly 134.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

The invention claimed is:
1. A laser engraving system, comprising:
    a laser transmitter configured to transmit a laser beam;
    a workpiece support surface;
    a lens assembly configured to focus the transmitted laser beam onto a workpiece supported by the workpiece support surface;
    a first base supporting a first mirror and a first camera;
    a rail system supporting the first base and configured to move the first base;
    a memory; and
    a controller operably connected to the first camera and the memory, the controller configured to execute program instructions stored in the memory to
        obtain a first image data from the first camera indicative of a first location of the transmitted laser beam on the first mirror when the first camera and the first mirror are at a first rail system location,
        obtain a second image data from the first camera indicative of a second location of the transmitted laser beam on the first mirror when the first camera and the first mirror are at a second rail system location spaced apart, along the rail system, from the first rail system location, and output a first mirror adjustment signal for the first mirror based upon the first image data and the second image data.

2. The laser engraving system of claim 1, wherein the controller is further operably connected to the rail system and configured to execute the program instructions stored in the memory to control the rail system to:
position the first camera and the first mirror at the first rail system location by positioning the first base at the first rail system location; and
position the first camera and the first mirror at the second rail system location by positioning the first base at the second rail system location.

3. The laser engraving system of claim 2, wherein the controller is further operably connected to the laser transmitter and configured to execute the program instructions stored in the memory to control the laser transmitter to:
obtain the first image data by obtaining an image of the first mirror;
transmit the laser beam when the first camera and the first mirror are positioned at the first rail system location; and
transmit the laser beam when the first camera and the first mirror are positioned at the second rail system location.

4. The laser engraving system of claim 2, wherein:
the laser engraving system includes at least one first motor operably connected to the first mirror, the at least one first motor configured to adjust an angular orientation of the first mirror with respect to the laser beam; and
the controller is further operably connected to the at least one first motor and configured to execute the program instructions stored in the memory to control the at least one first motor to adjust the angular orientation of the first mirror using the first mirror adjustment signal.

5. The laser engraving system of claim 2, further comprising:
a graphical user interface, wherein the controller is further configured to execute program instructions stored in the memory to control the graphical user interface to display user instructions based upon the output first mirror adjustment signal.

6. The laser engraving system of claim 2, further comprising:
a second base supporting a second mirror and a second camera, wherein:
the rail system supports the second base and is configured to move the second base;
the controller is further operably connected to the second camera; and
the controller is further configured to execute program instructions stored in the memory to
obtain a third image data from the second camera indicative of a third location of the transmitted laser beam on the second mirror when the second camera and the second mirror are at a third rail system location,
obtain a fourth image data from the second camera indicative of a fourth location of the transmitted laser beam on the second mirror when the second camera and the second mirror are at a fourth rail system location, and
output a second mirror adjustment signal for the second mirror based upon the third image data and the fourth image data.

7. The laser engraving system of claim 6, wherein the controller is further configured to execute the program instructions stored in the memory to control the rail system to:
position the second camera and the second mirror at the third rail system location by positioning the second base at the third rail system location; and
position the second camera and the second mirror at the fourth rail system location by positioning the second base at the fourth rail system location.

8. The laser engraving system of claim 7, wherein the controller is further configured to execute the program instructions stored in the memory to control the laser transmitter to:
transmit the laser beam when the second camera and the second mirror are positioned at the third rail system location; and
transmit the laser beam when the second camera and the second mirror are positioned at the fourth rail system location.

9. The laser engraving system of claim 7, wherein:
the laser engraving system includes at least one second motor operably connected to the second mirror, the at least one second motor configured to adjust an angular orientation of the second mirror with respect to the laser beam; and
the controller is further operably connected to the at least one second motor and configured to execute the program instructions stored in the memory to control the at least one second motor to adjust the angular orientation of the second mirror using the second mirror adjustment signal.

10. The laser engraving system of claim 6, further comprising:
a graphical user interface, wherein the controller is further configured to execute program instructions stored in the memory to control the graphical user interface to display user instructions based upon the output second mirror adjustment signal.

11. A method of operating a laser engraving system including a workpiece support surface and a lens assembly configured to focus a transmitted laser beam from a laser transmitter onto a workpiece supported by the workpiece support surface, comprising:
positioning a first base supporting a first camera and a first mirror at a first rail system location using a rail system supporting the first base and configured to move the first base;
transmitting a laser beam with the laser transmitter onto the first mirror while the first mirror is at the first rail system location;
obtaining with a controller a first image data from the first camera indicative of a first location of the transmitted laser beam on the first mirror when the first camera and the first mirror are at the first rail system location;
positioning the first base at a second rail system location spaced apart, along the rail system, from the first rail system location using the rail system thereby positioning the first camera and the first mirror at the second rail system location;
transmitting the laser beam with the laser transmitter onto the first mirror while the first mirror is at the second rail system location;
obtaining with the controller a second image data from the first camera indicative of a second location of the transmitted laser beam on the first mirror when the first camera and the first mirror are at the second rail system location;

determining with the controller first mirror adjustment data based upon the first image data and the second image data by executing with the controller program instructions stored in a memory;

outputting a first mirror adjustment signal for the first mirror based upon the determined first mirror adjustment data; and adjusting the first mirror based upon the first mirror adjustment signal.

12. The method of claim 11, wherein:

positioning the first base at the first rail system location comprises controlling the rail system with the controller to position the first base at the first rail system location; and positioning the first base at the second rail system location comprises controlling the rail system with the controller to position the first base at the first rail system location.

13. The method of claim 12, wherein:

obtaining with the controller the first image data includes obtaining an image of the first mirror;

transmitting the laser beam with the laser transmitter onto the first mirror while the first mirror is at the first rail system location comprises controlling the laser transmitter with the controller to transmit the laser beam with the laser transmitter onto the first mirror while the first mirror is at the first rail system location; and transmitting the laser beam with the laser transmitter onto the first mirror while the first mirror is at the second rail system location comprises controlling the laser transmitter with the controller to transmit the laser beam with the laser transmitter onto the first mirror while the first mirror is at the second rail system location.

14. The method of claim 12, wherein adjusting the first mirror based upon the first mirror adjustment signal comprises:

controlling with the controller at least one first motor operably connected to the first mirror to adjust an angular orientation of the first mirror with respect to the laser beam using the first mirror adjustment signal.

15. The method of claim 12, wherein outputting the first mirror adjustment signal comprises:

controlling a graphical user interface with the controller to display user instructions based upon the first mirror adjustment signal.

16. The method of claim 12, further comprising:

positioning a second base supporting a second camera and a second mirror at a third rail system location using the rail system, wherein the rail system is configured to support the second base and to move the second base;

transmitting the laser beam with the laser transmitter onto the second mirror while the second mirror is at the third rail system location;

obtaining with the controller a third image data from the second camera indicative of a third location of the transmitted laser beam on the second mirror when the second camera and the second mirror are at the third rail system location;

positioning the second base at a fourth rail system location using the rail system thereby positioning the second camera and the second mirror at the fourth rail system location;

transmitting the laser beam with the laser transmitter onto the second mirror while the second mirror is at the fourth rail system location;

obtaining with the controller a fourth image data from the second camera indicative of a fourth location of the transmitted laser beam on the second mirror when the second camera and the second mirror are at the fourth rail system location;

determining with the controller second mirror adjustment data based upon the third image data and the fourth image data by executing with the controller program instructions stored in the memory;

outputting a second mirror adjustment signal for the second mirror based upon the second mirror adjustment data; and adjusting the second mirror based upon the second mirror adjustment signal.

17. The method of claim 16, wherein:

positioning the second base at the third rail system location comprises controlling the rail system with the controller to position the second base at the third rail system location; and positioning the second base at the fourth rail system location comprises controlling the rail system with the controller to position the second base at the fourth rail system location.

18. The method of claim 17, wherein:

transmitting the laser beam with the laser transmitter onto the second mirror while the second mirror is at the third rail system location comprises controlling the laser transmitter with the controller to transmit the laser beam with the laser transmitter onto the second mirror while the second mirror is at the third rail system location; and transmitting the laser beam with the laser transmitter onto the second mirror while the second mirror is at the fourth rail system location comprises controlling the laser transmitter with the controller to transmit the laser beam with the laser transmitter onto the second mirror while the second mirror is at the fourth rail system location.

19. The method of claim 17, wherein adjusting the second mirror based upon the second mirror adjustment signal comprises:

controlling with the controller at least one second motor operably connected to the second mirror to adjust an angular orientation of the second mirror with respect to the laser beam using the second mirror adjustment signal.

20. The method of claim 17, wherein outputting the second mirror adjustment signal comprises:

controlling a graphical user interface with the controller to display user instructions based upon the second mirror adjustment signal.

* * * * *